United States Patent [19]

Howard

[11] 4,133,723
[45] Jan. 9, 1979

[54] ACTINIC RADIATION-CURABLE FORMULATIONS FROM THE REACTION PRODUCT OF ORGANIC ISOCYANATE, POLY(ALKYLENE OXIDE) POLYOL AND AN UNSATURATED ADDITION-POLYMERIZABLE MONOMERIC COMPOUND HAVING A SINGLE ISOCYANATE-REACTIVE HYDROGEN GROUP

[75] Inventor: Dennis D. Howard, Girard, Pa.

[73] Assignee: Lord Corporation, Erie, Pa.

[21] Appl. No.: 866,575

[22] Filed: Jan. 3, 1978

[51] Int. Cl.² .................. C08F 8/00; C08G 18/34; C08G 18/04
[52] U.S. Cl. .................. 204/15; 204/159.15; 204/159.16; 528/49; 528/75; 260/859 R
[58] Field of Search .............. 260/77.5 CR, 77.5 MA; 204/159.14, 159.15, 159.16

[56] References Cited

U.S. PATENT DOCUMENTS

| | | |
|---|---|---|
| 3,425,988 | 2/1969 | Gorman et al. .............. 260/77.5 CR |
| 3,509,234 | 4/1970 | Burlant et al. .............. 260/77.5 MA |
| 3,715,293 | 2/1973 | Sandner et al. .................. 204/159.15 |
| 3,759,807 | 9/1973 | Osborn et al. ................... 204/159.23 |
| 4,017,371 | 4/1977 | Morgan ........................ 260/77.5 CR |
| 4,017,652 | 4/1977 | Gruber ............................ 204/159.23 |
| 4,024,296 | 5/1977 | Gruber ............................ 204/159.23 |

*Primary Examiner*—M. J. Welsh
*Attorney, Agent, or Firm*—John A. Gazewood

[57] ABSTRACT

Energy-curable compositions which can be cured in the presence of air by exposure to actinic radiation contain at least one unsaturated urethane oligomer, said oligomer comprising the reaction product of at least one poly(alkylene oxide) polyol, at least one polyisocyanate, and at least one unsaturated active hydrogen-containing compound.

33 Claims, No Drawings

ACTINIC RADIATION-CURABLE FORMULATIONS FROM THE REACTION PRODUCT OF ORGANIC ISOCYANATE, POLY(ALKYLENE OXIDE) POLYOL AND AN UNSATURATED ADDITION-POLYMERIZABLE MONOMERIC COMPOUND HAVING A SINGLE ISOCYANATE-REACTIVE HYDROGEN GROUP

This invention relates to radiation-curable compositions. More particularly, the invention relates to actinic radiation-curable compositions characterized by a reduced sensitivity to oxygen inhibition during the curing process.

During the latter part of the past decade, significant advances have been made in the radiation processing of commercial products. The increased interest in energy-curable systems has been catalyzed by recently-enacted or impending legislation by federal, state and local governments which restrict the amount of solvent and other pollutants that can be vented to the atmosphere, and the increased concern expressed by individuals and unions over the possible toxic effects of prolonged exposure to volatile organic materials, as well as the sky-rocketing cost of solvents derived from petroleum coupled with a grim prospect of material unavailability. Generally, the energy-curable systems are 100% reactive systems, i.e., substantially all of the components react to produce the final product. As is well-known, the curing of such systems can be effected by several means, including exposure to high energy ionizing radiation; photopolymerization by actinic radiation in the presence of a photoinitiator; and by exposure to chemical free radical-generating agents, usually at an elevated temperature. A particular deficiency of all radiation curable compositions which cure via a free radical addition mechanism is a sensitivity to oxygen inhibition during the curing process. Oxygen inhibition is not a serious problem when cure is effected by exposure to high energy ionizing radiation or by exposure to thermally-activated free radical-generating agents. Oxygen inhibition does materially affect compositions which are cured by exposure to actinic radiation, such as ultraviolet light.

A typically actinic radiation-curable resin system contains an oligomer, which may or may not contain reactive functional groups (such as double bonds), a crosslinking agent, a reactive diluent for viscosity control, and a photosensitizer or photoinitiator. By selecting an oligomer which contains at least two points of reactive unsaturation, or a reactive diluent which likewise contains at least two points of reactive unsaturation, one may eliminate the need for a crosslinking agent per se. Control over the properties of the cured systems can be exercised via the structure of the oligomer backbone, including such factors as degree of chain-branching, types of functional groups, number and types of unsaturated bonds, molecular weight, etc.; functionality and level of crosslinking agents; nature and level of reactive diluent; kind and level of the sensitizer or photoinitiator; and the like. An exemplary oligomer which has obtained widespread commercial acceptance and which can be cured by exposure to actinic radiation in the absence of a crosslinking agent per se is an unsaturated urethane oligomer obtained by reacting an isocyanate-functional prepolymer with unsaturated compounds containing an isocyanate-reactive active hydrogen group. Before any polymerization can occur, free radicals must first be produced via the photoinitiator. The production of free radicals by the photoinitiator is a wave length function of the actinic radiation. Once the radicals are formed, propagation of polymer growth rapidly advances through chain reaction. Oxygen in the ground or unexcited state is itself a radical and is highly reactive with other radicals. Thus, chain growth can be terminated by the oxygen radical, resulting in uncured or tacky surfaces and, more importantly, the photoinitiator itself when in the free radical state can be capped and made ineffective.

The adverse effect of oxygen inhibition can be at least reduced by curing in an inert gaseous environment (nitrogen, argon, carbon dioxide, and the like). While effective, the use of inert gas environments is generally cumbersome and economically unattractive. Other methods which have been suggested for reducing the air inhibition effect on actinic energy-curable compositions include improved design of energy sources, increasing photoinitiator level, use of more reactive diluent systems, and use of natural and synthetic waxes. Except for the improved energy sources which must be proved out, the suggested methods directly affect ultimate properties of the cured systems and are not susceptible to widespread utilization. There remains a compelling need for means to reduce the sensitivity of actinic radiation-curable compositions to oxygen inhibition during the curing process, since the problem will increase in importance as the acceptance by industry of radiation-curable systems increases.

Gruber U.S. Pat. No. 4,017,652 discloses that oxygen inhibition of the photopolymerization of resins containing acrylic groups can be abated by employing a photocatalyst system containing (1) as a photosensitizer, at least one aromatic ketone or aromatic aldehyde which has a triplet energy in the range of from about 54 kilocalories per mole to about 72 kilocalories per mole and which promotes polymerization through bimolecular photochemical reactions of the energy donor type; and, (2), as a photoinitiator, at least one aromatic ketone which generates a radical pair by way of unimolecular homolysis resulting from photoexcitation. A preferred photocatalyst system is benzophenone and isobutyl benzoin ether. The proposed photocatalyst systems are effective in reducing oxygen inhibition; however, they suffer from the deficiency that the time required for cure in oxygen is longer than the time required to cure the same formulation in an inert environment. The increased cure cycle is highly disadvantageous, because of its deleterious effect on many substrates, such as warping and charring. There is a need for energy curable compositions which not only can be cured in the presenceof oxygen, but also can be cured at rates approaching those encountered when curing is effected in inert atmospheres.

Continued research into the development of energy curable compositions which can be cured by exposure to actinic radiation in the presence of air has resulted in the discovery that unsaturated urethane oligomers derived from certain hereinafter described polyols can, in combination with photocatalyst systems comprising at least one compound which promotes polymerization through bimolecular photochemical reactions of the energy donor type or hydrogen abstraction type and at least one compound which generates a free radical pair by way of unimolecular homolysis resulting from photoexcitation, be cured by exposure to actinic radiation in the presence of air in an unexpectedly short cure cycle. It was also discovered that (1) ultimate properties of the cured compositions can be enhanced by incorporating into the curable formulations at least one chain transfer agent and, (2), certain chain transfer agents are effective in further increasing rate of cure.

The present invention is based on the discovery that the nature of the polyol which is employed in forming energy-curable unsaturated urethane oligomers does materially affect the curing rate in air of such oligomers. More particularly, it has been discovered that the use of poly(alkylene oxide) polyols as precursor compounds for actinic radiation-curable unsaturated urethane oligomers affords compositions which can be cured in air at a rate which is commercially significantly more rapid than can be obtained with unsaturated urethane oligomers prepared from polyester polyol precursors. The discovery was particularly unexpected because there is no significant difference in the cure rate of unsaturated urethane oligomers prepared from polyester polyols or poly(alkylene oxide) polyols when cure is effected in an inert atmosphere. While the phenomenon is not understood, nor has a theoretical explanation been entirely formulated, the progression is on the order of poly(tetramethylene oxide) polyol>poly(prophylene oxide) polyol>polyester polyol. Unsaturated urethane oligomers derived solely from poly(ethylene oxide) polyols gel too rapidly to permit an effective evaluation of such polyethers; however, unsaturated urethane oligomers derived from block copolymers of ethylene glycol and at least one other glycol or alkylene oxide, as well as such oligomers derived from a mixture of two or more poly(alkylene oxide) polyols, do cure in air at a rate at least equivalent to the cure rate of unsaturated oligomers derived from poly(prophylene oxide) polyol.

Thus, in accordance with one aspect of the invention, there are provided novel unsaturated urethane oligomers comprising the reaction product of (i), at least one organic isocyanate compound having at least two isocyanate groups; (ii), at least one poly(alkylene oxide) polyol; and, (iii) at least one unsaturated addition-polymerizable monomeric compound having a single isocyanate-reactive active hydrogen group.

In a second aspect of the invention, there are provided novel energy curable compositions comprising (a), unsaturated urethane oligomers comprising the reaction product of (i), at least one organic isocyanate compound having at least two isocyanate groups, (ii), at least one poly(alkylene oxide) polyol, and, (iii), at least one unsaturated addition-polymerizable monomeric compound having a single isocyanate-reactive active hydrogen group; (b), at least one reactive monomer diluent; (c), a photocatalyst system comprising (1) at least one compound which promotes free radical addition polymerization through bimolecular photochemical reactions of the energy donor type or hydrogen abstraction type and, (2), at least one compound which promotes free radical addition polymerization by generating a radical pair by way of unimolecular homolysis resulting from photoexcitation; and, optionally, (d), an effective amount of at least one chain-transfer agent; and, also optionally, (e), up to about 75 percent by weight of at least one unsaturated urethane oligomer derived from a non-poly(alkylene oxide) polyol precursor, said weight percent being based on total weight of (a) and (e).

Additionally, the invention provides a process for coating a substrate which comprises applying to a surface of the substrate the energy-curable compositions of this invention and exposing such coated substrate to acting radiation in the presence of air whereby the coating is cured into a hard mar and abrasion resistant film. The invention also contemplates articles of manufacture comprising a substrate having a desired geometrical configuration and size having thereon a cured wear coating, said coating being formulated, applied and cured according to the concepts of the herein-described invention.

The novel unsaturated urethane oligomers of the present invention are characterized by the presence of at least one ethylenically unsaturated group having the structure —CH=C<, preferably having the structure $CH_2 = C<$, said group preferably being terminally located; and having a main carbon-carbon chain or backbone consisting essentially of at least one poly(alkylene oxide) polyol, said main chain or backbone being separated from said ethylenically unsaturated group by two urethane groups. Such unsaturated urethane oligomers comprise the reaction product of (i) at least one organic isocyanate compound having at least two isocyanate groups;

(ii) at least one poly(alkylene oxide) polyol; and (iii) at least one unsaturated addition-polymerizable monomeric compound having a single isocyanate-reactive active hydrogen group;

there being present an excess of isocyanate compound with respect to the hydroxyl groups of said poly(alkylene oxide) polyol;

said unsaturated addition-polymerizable monomeric compound having a single isocyanate-reactive active hydrogen group being present in an amount sufficient to provide at least one molar equivalent of active hydrogen group with respect to isocyanate reactivity. The invention contemplates unsaturated urethane oligomers having at least one reactive isocyanate moiety, as well as such oligomers having substantially no reactive isocyanate functionality, with the latter oligomers being especially preferred. An especially preferred class of unsaturated urethane oligomers are the acrylated urethane oligomers, urethane oligomers which have been modified by incorporating into the oligomeric molecule one or more acrylic groups having the structure

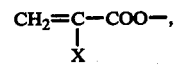

wherein X is hydrogen, halogen or an alkyl group of 1 to 8 carbon atoms.

The isocyanate compounds which are employed in forming the unsaturated urethane oligomers in accordance with the present invention can be any organic isocyanate compound having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, tolylene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4',4''-triisocyanate, polymethylene polyphenylisocyanate, m-phenylene diisocyanate, p-phenylene diisocyanate, 2,6-tolylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylene-1,4-diisocyanate, xylylene-1,3-diisocyanate, cyclohexyl-1,4-diisocyanato, 4,4'-methylene-bis(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a ratio of 1:3, and the like. The diisocyanate compounds are preferred, with 4,4'-methylene-bis(cyclohexyl isocyanate) being especially preferred.

It is an essential feature of the novel unsaturated urethane oligomers of the present invention that such oligomers contain as a backbone the residue of at least one poly(alkylene oxide) polyol. The poly(alkylene oxide) polyols which must be employed in the practice of this invention are poly(alkylene oxide) compounds containing at least two hydroxy groups. Such compounds are normally obtained from the polymerization, including block copolymerization, of cyclic ethers such as alkylene oxides, dioxolane and tetrahydrofuran, the condensation of glycols, or the condensation of cyclic ethers with glycols. They are well-known articles of commerce, and are also called polyalkyelen ether glycols, polyalkylene glycols, polyalkylene oxide glycols, polyglycols and polyoxyalkylene glycols. Preferred poly(alkylene oxide) polyols have from 1 to 9, preferably 1 to 6, carbon atoms in the alkylene chain separating each pair of oxygen atoms and have a number average molecular weight in the range from about 250 to about 4000, preferably from about 250 to about 2500. Not all the alkylene units need be the same. Poly(alkylene oxide) polyols formed the copolymerization or condensation of mixtures of different cyclic ethers, glycols or glycols and cyclic ethers can be used, as can poly(alkylene oxide) derived from cyclic ethers such as dioxolane, which affords a polyol having the formula HO(CH$_2$—O—CH$_2$CH$_2$O)$_n$H, where n is an integer greater than 1. The alkylene units can be a straight chain or a branched chain, as in poly(propylene oxide) polyol. In the case where the alkylene unit is ethylene, it has been found advantageous to incorporate the unit into a copolymer, for example, as a copolymer of ethylene oxide and propylene oxide, with up to about 80 weight percent of such copolymer comprising ethylene oxide. Representative poly(alkylene oxide) polyols include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus the poly(alkylene oxide) polyols will generally have from 2 to 6 hydroxyl groups, with such polyols having 2 hydroxyl groups being presently preferred. Preferred poly(alkylene oxide) polyols are poly(propylene oxide) diol, poly(ethylene oxide-propylene oxide) diol and poly(tetramethylene oxide) diol, with the latter being especially preferred.

Unsaturated addition-polymerizable monomeric organic compounds having a single isocyanate-reactive hydrogen group which can be employed in the practice of the present invention include any of such compounds which have been previously used to introduce an unsaturated polymerizable moiety into a molecule via reaction between the active hydrogen group and a reactive isocyanate moiety. Preferably, the active hydrogen group is hydroxy. Illustrative of unsaturated addition-polymerizable monomeric organic compounds having a single isocyanate-reactive active hydrogen group are 2-hydroxyethyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, diethylene glycol monoacrylate, diethylene glycol monomethacrylate, glycerine dimethacrylate, trimethylol propane dimethacrylate, and the like. The amount of such compounds will be sufficient to provide at least one molar equivalent of active hydrogen group with respect to isocyanate functionality, and preferably is sufficient to afford an active hydrogen group: NCO ratio, with respect to the amount of total free hydroxyl functions, of at least 1:1, with a small excess, 10 mol percent or less, being expecially preferred.

The novel unsaturated urethane oligomers can be prepared by any of several known reaction routes, including (1) simultaneous reaction of polyisocyanate, poly(alkylene oxide) polyol and unsaturated addition-polymerizable monomeric compound having a single isocyanate-reactive active hydrogen group; and (2) reaction of polyisocyanate and unsaturated addition-polymerizable monomeric compound having a single isocyanate-reactive active hydrogen group to form an unsaturated isocyanate-functional compound which is then reacted with the poly(alkylene oxide) polyol, the amount of unsaturated isocyanate being sufficient to consume all hydroxyl groups of the polyol with excess isocyanate functions being preferably reacted with additional unsaturated polymerizable monomeric compound. The preferred method of forming the herein described oligomers is, (3) a two-step process comprising, (I), contacting poly(alkylene oxide polyol with sufficient polyisocyanate to form an isocyanate-functional urethane prepolymer, and, (II), contacting such urethane prepolymer with unsaturated addition-polymerizable monomeric organic compound having a single isocyanate-reactive active hydrogen group to produce the desired oligomer having at least one unit of ethylenic unsaturation per molecule, with acrylated urethane oligomers, especially acrylated urethane oligomers having substantially no free isocyanate functionality, being especially preferred. In forming the herein described oligomers, there will be employed at least a slight excess of polyisocyanate with respect to the hydroxyl functions of the polyol. Preferably, the amount of polyisocyanate will be sufficient to provide an NCO:OH ratio, with respect to the hydroxyl groups of the poly(alkylene oxide ether) polyol, of at least 2.1:1, preferably at least 2.3:1, and especially at least 2.5:1, with an NCO:OH ratio in the range of about 2.5–5:1 being particularly preferred. The oligomers of this invention can be prepared neat, as can the intermediates in the multi-step processes, but are preferably prepared in the presence of a diluent phase which is copolymerizable with the unsaturated urethane oligomer but is otherwise inert during the particular process of preparing the oligomers. Because the various methods of preparing unsaturated urethane resins are well-known, for example, see U.S. Pat. No. 3,700,643, it is considered that any detailed discussion of such methods is unnecessary.

As noted, the energy-curable compositions of the present invention comprise a mixture of (i) at least one unsaturated urethane resin prepared in accordance with this invention;

(ii) a reactive diluent system comprising at least one unsaturated addition-polymerizable monomeric compound which is copolymerizable with said unsaturated urethane resin, and preferably containing at least one acrylic and/or methacrylic acid ester containing at least 4 carbon atoms in the non-acid moiety;

(iii) an effective amount of a photocatalyst system comprising a mixture of (1) at least one compound which promotes free radical addition polymerization through bimolecular photochemical reactions of the energy donor type or hydrogen abstraction type and (2) at least one compound which promotes free radical polymerization by generating a radical pair by way of unimolecular homolysis resulting from photoexcitation;

(iv) optionally, an effective amount of at least one chain transfer agent; and (v) optionally, up to about 75 percent by weight of at least one unsaturated urethane oligomer, preferably an acrylated urethane oligomer, said oligomer having as a polyol precursor at least one non-poly(alkylene oxide) polyol.

Reactive diluent systems which can be employed in the energy curable compositions of this invention include any of such systems which have been or are being used for this purpose. Broadly, suitable reactive diluent systems comprise at least one unsaturated addition-polymerizable monomeric compound which is copolymerizable with the unsaturated urethane oligomer upon exposure to acting radiation. The reactive diluent can be monofunctional or polyfunctional, with respect to polymerizable moieties. A single polyfunctional reactive diluent can be used, as can mixtures thereof; or a combination of one or more monofunctional reactive diluents and one or more polyfunctional reactive diluents can be used. Such combinations of mono- and polyfunctional reactive diluents are presently preferred. Generally, the reactive diluent system will comprise from about 10 to about 65, preferably about 15 to about 50, weight percent, based on total weight of unsaturated urethane oligomer and reactive diluent, of the energy curable compositions of the invention. Particularly preferred reactive diluents are unsaturated addition-polymerizable monofunctional monomeric compounds selected from the group consisting of esters having the general formula

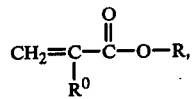

wherein $R^0$ is hydrogen or methyl, and R is an aliphatic or cycloaliphatic group having from 4 to 18 carbon atoms. Representative of such preferred reactive monomeric diluents, without limitation thereto, are hexyl acrylate, cyclohexyl acrylate, 2-ethylhexyl acrylate, octyl acrylate, nonyl acrylate, stearyl acrylate, and the corresponding methacrylates. Illustrative of other reactive monofunctional and polyfunctional monomeric diluents which can be employed are styrene, methyl methacrylate, butyl acrylate, isobutyl acrylate, 2-phenoxy acrylate, 2-methoxyethyl acrylate, 2-(N,N-diethylamino)-ethyl acrylate, the corresponding methacrylates, acrylonitrile, methyl acrylonitrile, methacrylamide, neopentyl glycol diacrylate, ethylene glycol diacrylate, hexylene glycol diacrylate, diethylene glycol diacrylate, trimethylol propane triacrylate, pentaerythritol di-, tri-, or tetra-acrylate, the corresponding methacrylates, vinyl pyrrolidone, and the like. At the present time, it is preferred that the reactive diluent system contain at least one acrylic and/or methacrylic acid ester having at least 6 carbon atoms in the non-acid moiety, with such acrylic acid esters being preferred. Reactive diluent systems are well-known to those skilled in the art of radiation curing and the selection of an appropriate diluent system in any given instance is sufficiently encompassed by such knowledge as to require no further discussion here.

Compounds which are effective to promote free radical addition polymerization through bimolecular photochemical reactions of the energy donor or hydrogen abstraction types are well-known, as are compounds which are effective to promote free radical addition polymerization by the generation of free radicals by way of unimolecular homolysis resulting from photoexcitation. Such compounds are described as photosensitizers and photoinitiators, respectively, by at least one patentee, see Gruber U.S. Pat. No. 4,017,652 and, for the purpose of establishing some measure of consistency with respect to nomenclature, that description will be followed herein. With respect to photopolymerization processes, photosensitizers are not good initiators per se, but do readily absorb protons to produce an excited molecule which then interacts either by hydrogen abstraction or through energy transfer with a second molecule to produce free radicals which are capable of initiating addition polymerization reactions. Unlike the photosensitizers which form free radicals through interaction with a second molecule, photoinitiators absorb protons to produce an excited molecule which can cleave to produce free radicals which are capable of initiating addition polymerization reactions.

The photocatalyst systems of the present invention can employ, in combination, an effective amount of an admixture comprising, (1) an effective amount of at least one photosensitizer which is effective to promote free radical addition polymerization through bimolecular photochemical reactions of the energy donor or hydrogen abstraction types and, (2), an effective amount of at least one photoinitiator which is effective to promote free radical addition polymerization by generating free radicals by way of unimolecular homolysis resulting from photoexcitation. Such mixtures generally will comprise from about 0.01 to about 50, preferably from about 0.1 to about 15 parts by weight, per 100 parts by combined weight of unsaturated urethane oligomer and reactive diluent, of such photosensitizer and from about 0.01 to about 10, preferably from about 0.05 to about 7, parts by weight, per 100 parts by combined weight of unsaturated urethane oligomer and reactive diluent, of such photoinitiator.

Particularly preferred photosensitizers, which are an essential first component of the photocatalyst systems employed in the practice of this invention, are aromatic ketones and aromatic aldehydes which can exist in a triplet state, especially such ketones and aldehydes which have a triplet energy in the range from about 54 to about 72 kilocalories per mole. Such photosensitizers are described in Gruber U.S. Pat. No. 4,017,652 and Osborn et al U.S. Pat. No. 3,759,807, the disclosures of both patents being incorporated herein by reference.

Photoinitiators, which are an essential second component of the photocatalyst systems employed in the practice of this invention, are preferably selected from compounds having the formula

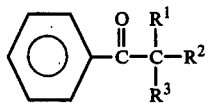

1.

wherein $R^1$, $R^2$ and $R^3$ are independently hydrogen, hydroxyl, halogen, alkyl of 1 to 12, preferably 1 to 8, carbon atoms, alkoxy of 1 to 12, preferably 1 to 8, carbon atoms, or phenyl, providing that $R^1$, $R^2$ and $R^3$ are not concurrently all hydrogen, hydroxyl, halogen, or alkyl; and wherein at least one of $R^1$, $R^2$ or $R^3$ is preferably hydroxyl or alkoxy. The alkyl, alkoxy and phenyl groups can be substituted with moieties which will not interfere with the function of the compound as a photoinitiator. Representative substituent moieties or groups include halogen, alkyl of 1 to 8 carbon atoms, alkoxy having from 1 to 8 carbon atoms in the alkyl group, carboxy and carbalkoxy having from 1 to 8 carbon atoms in the alkyl groups. Photoinitiators in which the alkyl, alkoxy and phenyl groups are unsubstituted are preferred. A second class of preferred photoinitiators has the formula

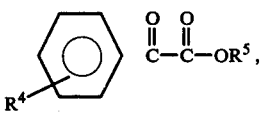

2.

wherein $R^4$ is hydrogen, halogen, alkoxy containing from 1 to 8, preferably 1 to 4, carbon atoms or alkyl containing from 1 to 8, preferably 1 to 4 carbon atoms; and $R^5$ is hydrogen, alkyl containing from 1 to 22 carbon atoms, benzyl, phenyl, hydroxyalkyl containing from 1 to 12 carbon atoms, haloalkyl containing from 1 to 12 carbon atoms, alkoxyalkyl wherein the alkoxy portion contains from 1 to 8 carbon atoms and the alkyl portion contains from 1 to 12 carbon atoms, and phenoxyalkyl wherein the alkyl portion contains from 1 to 12 carbon atoms, $R^5$ being preferably hydrogen, alkyl of 1 to 12 carbon atoms, benxyl or phenyl.

Particularly preferred photoinitiator compounds are represented by the formulae

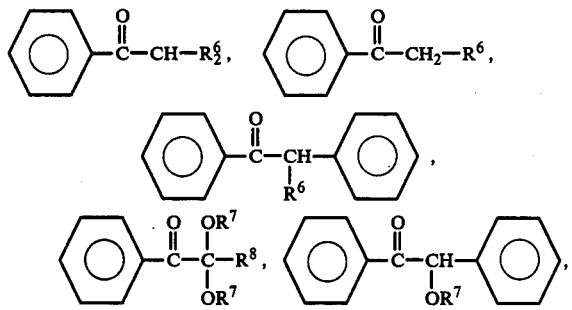

wherein $R^6$ is halogen; $R^7$ is an alkyl group having from 1 to 12, preferably 1 to 8, carbon atoms; and $R^8$ is hydrogen, alkyl of 1 to 12 carbon atoms, aryl of 6 to 14 ring carbon atoms, and cycloalkyl of 5 to 8 ring carbon atoms. Where a plurality of $R^6$ or $R^7$ groups are found on the molecule, they can be the same or different.

The photoinitiators which are employed in combination with the heretofore described photosensitizers in the practice of the invention are well-known articles of commerce. A representative listing of such compounds can be found in U.S. Pat. No. 4,017,652, column 4, lines 46–63; U.S. Pat. No. 4,024,296, column 4, lines 18–37; and U.S. Pat. No. 3,715,293, column 1, line 41 through column 2, line 13.

Presently preferred photocatalyst systems comprise admixtures of, (a), benzophenone and benzoin isobutyl ether and, (b), benzophenone and 2,2-diethoxyacetophenone.

Substantially any of the known chain transfer agents can be employed in the practice of the present invention. Generally, such compounds, when utilized, will be employed at levels not exceeding about 15 parts by weight, per 100 parts of combined weight of unsaturated urethane oligomer and reactive diluent, and preferably will be employed in the range from about 0.1 to about 5 parts by weight. Representative chain transfer agents for addition polymerization reactions include benzene; toluene; ethylbenzene; isopropylbenzene; t-butylbenzene; cyclohexane; heptane; n-butyl chloride; n-butyl bromide; n-butyl iodine; n-butyl alcohol; n-butyl disulfide; acetone; acetic acid; chloroform; carbon tetrachloride; carbon tetrabromide; butylamine; triethylamine; t-butyl mercaptan; n-butyl mercaptan; tertiary aliphatic amines such as triethanolamine and t-butyl diethanolamine; 2-ethylhexane-1,3-dithiol; 1,10-decanedithiol; 1,2-ethanedithiol; 1,3-propanedithiol; 1,6-octanedithiol; 1,8-octanedithiol; 1,10-octadecanedithiol; m-benzenedithiol; bis-(2-mercaptoethyl) sulfide; p-xylylenedithiol; pentaerythritol tetra-7-mercaptoheptanoate; mercaptoacetic acid triglyceride; pentanethiol; dodecanethiol; glycol mercaptoacetate; ethyl mercaptoacetate; and esters of thioglycolic and mercaptopropionic acids. Preferred chain transfer agents include both monothiols and polythiols; the polythiols having a molecular weight in the range from about 95 to about 20,000 and having the general formula $$R^9(SH)_m,$$

wherein $R^9$ is a polyvalent organic moiety and m is at least 2, being especially preferred. During the investigation into the phenonemon of curing the hereindescribed unsaturated urethane oligomers derived from poly(alkylene oxide) polyols, it was discovered that the polythiols, when used in combination with the herein described photocatalyst systems, provide a totally unexpected improvement, of a synergistic nature, in cure rate upon exposure to actinic radiation in the presence of air. Particularly preferred polythiols include glycerol trithioglycolate; pentaerythritol tetrathioglycolate; pentaerythritol tetrakis (β-mercaptopropionate); trimethylolpropane tris(thioglycolate); trimethylolpropane tris(β-mercaptopropionate); ethylene glycol bis(thioglycolate); ethylene glycol bis(β-mercaptopropionate) and poly(propylene oxide ether) glycol bis(β-mercaptopropionate).

As noted, unsaturated urethane oligomers having as a polyol precursor a compound which is not a poly(alkylene oxide) poly can be combined with the novel poly(alkylene oxide) polyol-based unsaturated urethane oligomer. In such cases, the coating compositions should contain at least about 25 percent by total weight of combined unsaturated urethane oligomers of at least one poly(alkylene oxide) polyol-based unsaturated urethane oligomer. Representative polyol precursors for such other unsaturated urethane oligomers are polyesters, including caprolactone polyol polyesters.

Preferably, the coating compositions of the invention will also contain from about 0.1 to about 10 parts by weight, per 100 parts combined weight of acrylic urethane oligomer and reactive diluent, of acrylic acid.

The invention compositions can also include pigments, fillers, wetting agents, flatting agents, flow control agents, and other additives typically present in coating compositions. In some applications, the inclusion of minor amounts of inert solvents can be advantageous. Such additive materials are well-known to those skilled in the art and do not require further elaboration herein. Also well-known are the concentrations at which such additives are used.

The coating compositions of this invention are prepared by conventional methods such as blending. The compositions can be applied to wood, metal, fabric and plastic substrates in an economical and efficient manner using conventional industrial techniques and provide smooth, uniform films which are rapidly cured to dried films having excellent physical and chemical properties. The compositions are particularly noteworthy in that they can be cured in the presence of air at rates equivalent to those obtained in inert atmospheres.

The improved coating compositions of this invention can be applied and cured by any of the conventional known methods. Application can be by roll coating, curtain coating, airless spray, dipping or by any other procedure. The cure can be effected by exposure to any high energy source, such as ionizing radiation, or low energy source, and are especially suitable for curing by exposure to actinic radiation, such as ultraviolet light radiation, in the presence of molecular oxygen. The equipment utilized for curing, as well as the appropriate time for curing, and the conditions under which the curing is effected are well-known to those skilled in the art of radiation curing and do not require further elaboration herein.

The invention is illustrated in greater detail by the following Examples, but these examples are not to be construed as limiting the present invention. All parts, percentages and the like are in parts by weight, unless otherwise indicated.

EXAMPLE I

Several acrylated urethane resins are prepared employing as precursor compounds 4,4'-methylene-bis(cyclohexyl isocyanate), 2-hydroxyethyl acrylate and polyester polyol or poly(alkylene oxide) polyol; with 2-ethylhexyl acrylate serving as inert reaction medium. In each instance, the polyol is reacted with an excess of the polyisocyanate compound in 2-ethylhexyl acrylate to form an isocyanate-functional prepolymer in 2-ethylhexyl acrylate; the prepolymer is reacted with 2-hydroxyethylacrylate in the presence of 2-ethylhexyl acrylate reaction medium to form the acrylated urethane oligomer having at least two terminal ethylenically unsaturated groups and substantially no free isocyanate functions. Depending upon the amount of 2-ethylhexyl acrylate which is employed as reaction medium, the acrylated urethane composition is neat, that is, 100 percent resin solids, or a syrup of acrylated urethane oligomer in 2-ethylhexyl acrylate reactive monomer diluent at resin solids concentration of 70 or 90 percent by weight. The acrylated urethane oligomer resins are further characterized in Table I.

EXAMPLE II

Formulations are prepared employing Resin A from Example I according to the schedules of Table II.

Compositions A-G are coated onto aluminum substrates to provide a wet film thickness of 1.5 mil. Compositions C and E-K are coated onto vinyl sheeting to provide a wet film thickness of 1.5 mil. The thus coated substrates are cured by exposure to ultraviolet light (200 watts/in. mercury lamp) at a line speed of 50 feet per minute. The exposure time required in separate passes through the curing unit to obtain a tack-free, mar-resistant finish is reported in Table III.

TABLE I

| | ACRYLATED URETHANE OLIGOMER RESIN COMPOSITIONS | | | | | | | | | | | | | |
|---|---|---|---|---|---|---|---|---|---|---|---|---|---|---|
| Resin composition | A | B | C | D | E | F | G | H | I | J | K | L | M | N |
| Polyol | | | | | | | | | | | | | | |
| Type | 1 | 2 | 3 | 3 | 3 | 3 | 3 | 3 | 3 | 3 | 3 | 4 | 4 | 4 |
| Hydroxyl functionality | 2.3 | 3.0 | 2.0 | 2.0 | 2.0 | 2.0 | 2.0 | 2.0 | 2.0 | 2.0 | 2.0 | 2.0 | 2.0 | 2.0 |
| MW, number average | 500 | 630 | 410 | 410 | 410 | 410 | 710 | 710 | a | a | a | 650 | 650 | 1000 |
| Ratio, NCO:OH | 2.5:1 | 2.5:1 | 2.5:1 | 2.5 | 2.5:1 | 3.0:1 | 2.5:1 | 3.0:1 | 2.0:1 | 2.5:1 | 3.0:1 | 2.0:1 | 3.0:1 | 3.0:1 |
| Resin concentration % | 70 | 70 | 70 | 90 | 90 | 90 | 90 | 90 | 90 | 90 | 90 | 100 | 100 | 100 |
| Solution viscosity, thousand cps | 22.0 | | | | | | | | | | | | | |

1: 1,3-butylene glycol/glycerine/adipic acid/isophthalic acid polyester polyol.
2: Poly(propylene oxide) triol polyether polyol.
3: Poly(propylene oxide) diol polyether polyol.
4: Poly(tetramethylene oxide) diol polyether polyol.
a: Equal molar amounts of poly(propylene oxide) diol polyether polyols having number average molecular weights of 410 and 710.

TABLE II

| | POLYESTER POLYOL-BASED ACRYLIC URETHANE OLIGOMER COMPOSITIONS | | | | | | | | | | |
|---|---|---|---|---|---|---|---|---|---|---|---|
| Formulation | A | B | C | D | E | F | G | H | I | J | K |
| Resin A | 70 | 70 | 70 | 70 | 70 | 70 | 70 | 70 | 70 | 70 | 70 |
| 2-ethylhexyl acrylate | 35 | 35 | 35 | 35 | 35 | 35 | 35 | 35 | 35 | 35 | 35 |
| Pentaerythritol triacrylate | 1.5 | 1.5 | 1.5 | 1.5 | 1.5 | 1.5 | 1.5 | 1.5 | 1.5 | 1.5 | 1.5 |
| Acrylic acid | 1.0 | 1.0 | 1.0 | 1.0 | 1.0 | 1.0 | 1.0 | 1.0 | 1.0 | 1.0 | 1.0 |
| Photocatalyst system | | | | | | | | | | | |
| Photosensitizer | 0 | $1.0^a$ | $1.0^a$ | $1.0^a$ | $2.0^a$ | $3.0^a$ | $4.0^a$ | $2.0^a$ | $2.0^a$ | $2.0^a$ | $2.0^a$ |
| Photoinitiator | $1.0^b$ | — | $1.0^b$ | $2.0^b$ | $1.0^b$ | $1.0^b$ | $1.0^b$ | $1.0^b$ | $1.0^b$ | $1.0^b$ | $1.0^b$ |
| Thiol compound | — | — | — | — | — | — | — | $1.0^c$ | $2.0^c$ | $3.0^c$ | $4.0^c$ |

$^a$Benzophenone
$^b$Benzoin isobutyl ether
$^c$Pentaerythritol tetrakis (β-mercaptopropionate)

TABLE III

Time Required For Cure to Tack-Free, Mar-Resistant Finish

| Coating Example Formulation | Cure Rate Ft./Min. | Aluminum Substrate Atmosphere O₂ | Aluminum Substrate Atmosphere N₂ | Vinyl Substrate Atmosphere O₂ | Vinyl Substrate Atmosphere N₂ |
|---|---|---|---|---|---|
| II-A | 50 | 6 | 1 | — | — |
| II-B | 50 | $2^a$ | $1^a$ | — | — |
| II-C | 50 | 2 | 1 | $3^b$ | 2 |
| II-D | 50 | 2 | 1 | — | — |
| II-E | 50 | 2 | 1 | $3^b$ | 2 |
| II-F | 50 | 2 | 1 | $3^b$ | 2 |
| II-G | 50 | 2 | 1 | $3^b$ | 2 |
| II-H | 50 | 1 | 1 | $2^c$ | 2 |
| II-I | 50 | 1 | 1 | $2^c$ | 2 |
| II-J | 50 | 1 | 1 | $2^c$ | 2 |
| II-K | 50 | 1 | 1 | $2^c$ | 2 |

$^a$Complete surface cure, but bulk of coating below surface is incompletely cured.
$^b$Coating is mar-resistant, but gloss retention after scrubbing is significantly poorer in comparison to compositions cured in nitrogen.
$^c$As amount of thiol compound is increased, film toughness increases, film modulus decreases, stain resistance is unchanged and scrub resistance (gloss retention after scrubbing, percent of original gloss) as function of thiol compound is as follows

| Thiol compound, parts by weight | 1 | 2 | 3 | 4 |
|---|---|---|---|---|
| Gloss retention, % original gloss | 55 | 70 | 80 | 82.5 |

At all levels of thiol compound, gloss retention after scrubbing and stain resistance is poorer with each of compositions H–K when cured in $C_2$ in comparison to each of compositions H–K cured in $N_2$.

As can be seen from the data, unsaturated urethane oligomers derived from polyester polyol generally exhibit a slower cure rate in air upon exposure to actinic radiation than in an inert atmosphere such as nitrogen. However, the addition of pentherythritol tetrakis (β-mercaptopropionate) chain transfer agent to the mixed photosensitizer-photoinitiator photocatalyst system is effective in increasing the rate of cure in air of unsaturated urethane oligomers derived from polyester polyols to a level equivalent to the cure rate in an inert environment such as nitrogen. When used alone, pentaerythritol tetrakis (β-mercaptopropionate) is ineffective, insofar as curing the unsaturated urethane oligomer compositions is concerned, in air and inert atmospheres. However, film properties of all compositions cured in air are generally poorer than are the film properties of the corresponding compositions cured in nitrogen.

EXAMPLE III

A composition is prepared employing Resin B from Example I as follows:

| | |
|---|---|
| Resin B | 70 |
| 2-Ethylhexyl acrylate | 35 |
| Pontaerythritol triacrylate | 1.5 |
| Acrylic acid | 1.0 |
| Benzophenone | 3 |
| Benxoin isobutyl ether | 1 |
| Pentaerythritol tetrakis (β-mercaptopropionate) | 3 |

The composition is coated onto aluminum and vinyl substrates to provide a wet film thickness of 1.5 mil. The thus-coated substrates are cured by exposure to ultraviolet light (200 watts/in. mercury lamp) at a line speed of 50 feet per minute. The formulation cures in an oxygen environment to a mar-resistant surface on aluminum in one pass and on vinyl in two passes. The cure rate of the formulation in air is essentially equivalent to the cure rate of the formulation in nitrogen, and film properties are also substantially equivalent.

EXAMPLE IV

Employing Resins A and C from Example I, formulations are prepared as follows:

| Formulation | A | B | C | D | E |
|---|---|---|---|---|---|
| Resin A | 70 | 52.5 | 35 | 17.5 | 0 |
| Resin C | 0 | 17.5 | 35 | 52.5 | 100 |
| 2-hydroxyethyl acrylate | 35 | 35 | 35 | 35 | 35 |
| Pentaerythritol triacrylate | 1.5 | 1.5 | 1.5 | 1.5 | 1.5 |
| Acrylic acid | 1.0 | 1.0 | 1.0 | 1.0 | 1.0 |
| Benzophenone | 3.0 | 3.0 | 3.0 | 3.0 | 3.0 |
| Benzoin isobutyl ether | 1.0 | 1.0 | 1.0 | 1.0 | 1.0 |
| Pentaerythritol tetrakis (β-mercaptopropionate) | 3.0 | 3.0 | 3.0 | 3.0 | 3.0 |

The formulations are coated onto aluminum at a wet film thickness of 1.5 mil. The thus-coated substrates are exposed to ultraviolet light radiation (200 watt/in. mercury lamp) in air at a line speed of 50 feet per minute. Formulation A requires two passes through the curing unit to obtain a tack-free, mar-resistant surface. Formulations B-E cure in a single pass to a tack-free, mar-resistant surface. The data demonstrate the improvement in cure rate which is obtained by the presence of unsaturated urethane oligomers derived from poly-(alkylene oxide) polyols.

EXAMPLE V

Employing Resins E-K from Example I, formulations were prepared as follows:

| Formulation | A | B | C | D | E | F | G |
|---|---|---|---|---|---|---|---|
| Resin E | 90 | — | — | — | — | — | — |
| Resin F | — | 90 | — | — | — | — | — |
| Resin G | — | — | 90 | — | — | — | — |
| Resin H | — | — | — | 90 | — | — | — |
| Resin I | — | — | — | — | 90 | — | — |
| Resin J | — | — | — | — | — | 90 | — |
| Resin K | — | — | — | — | — | — | 90 |
| Z-ethylhenyl acrylate | 15 | 15 | 15 | 15 | 15 | 15 | 15 |
| Pentaerythritol triacrylate | 1.5 | 1.5 | 1.5 | 1.5 | 1.5 | 1.5 | 1.5 |
| Acrylic acid | 1.0 | 1.0 | 1.0 | 1.0 | 1.0 | 1.0 | 1.0 |
| Benzophenone | 3.0 | 3.0 | 3.0 | 3.0 | 3.0 | 3.0 | 3.0 |
| Benzoin isobutyl ether | 1.0 | 1.0 | 1.0 | 1.0 | 1.0 | 1.0 | 1.0 |
| Pentaerythritol tetrakis (β-mercaptopropionate) | 3.0 | 3.0 | 3.0 | 3.0 | 3.0 | 3.0 | 3.0 |

The formulations are coated onto aluminum panels at a wet film thickness of 1.5 mil. The thus-coated substrates are cured in air by exposure to ultraviolet light radiation (200 watt/in. mercury lamp) at line speeds of 50 feet per minute and 100 feet per minute. All formulations cure in air to a tack-free, mar-resistant surface in one pass at a rate of 50 feet per minute. At a cure rate of 100 feet per minute, all formulations require two passes to cure in air to a tack-free, marresistant surface.

EXAMPLE VI

Employing Resins A, Bond L-N of Example I, formulations are prepared as follows:

| Formulation | A | B | C | D | E | F | G | H |
|---|---|---|---|---|---|---|---|---|
| Resin A | 70 | 70 | — | — | — | — | — | — |
| Resin B | — | — | 70 | 70 | — | — | — | — |
| Resin L | — | — | — | — | 80 | 80 | 70 | 70 |
| Resin M | — | — | — | — | — | — | — | — |
| Resin N | — | — | — | — | — | — | — | — |
| 2-ethylhexyl acrylate | 35 | 35 | 35 | 35 | 25 | 25 | 35 | 35 |
| Pentaerythritol triacrylate | 1.5 | 1.5 | 1.5 | 1.5 | 1.5 | 1.5 | 1.5 | 1.5 |
| Acrylic acid | 1.0 | 1.0 | 1.0 | 1.0 | 1.0 | 1.0 | 1.0 | 1.0 |
| Benzophenone | 3.0 | 3.0 | 3.0 | 3.0 | 3.0 | 3.0 | 3.0 | 3.0 |
| Benzoin isobutyl ether | 1.0 | 1.0 | 1.0 | 1.0 | 1.0 | 1.0 | 1.0 | 1.0 |
| Pentaerythritol tetrakis (β-mercaptopropionate) | 3.0 | 0.0 | 3.0 | 0.0 | 3.0 | 0.0 | 3.0 | 0.0 |
| Viscosity, thousand cps | 4 | 4 | 4 | 4 | 30 | 4 | 30 | 4 |

-continued

| Formulation | I | J | K | L | M | N | O | P |
|---|---|---|---|---|---|---|---|---|
| Resin A | — | — | — | — | — | — | — | — |
| Resin B | — | — | — | — | — | — | — | — |
| Resin L | — | — | — | — | — | — | — | — |
| Resin M | 80 | 80 | 70 | 70 | — | — | — | — |
| Resin N | — | — | — | — | 80 | 80 | 70 | 70 |
| 2-ethylhexyl acrylate | 25 | 25 | 35 | 35 | 25 | 25 | 35 | 35 |
| Pentaerythritol triacrylate | 1.5 | 1.5 | 1.5 | 1.5 | 1.5 | 1.5 | 1.5 | 1.5 |
| Acrylic acid | 1.0 | 1.0 | 1.0 | 1.0 | 1.0 | 1.0 | 1.0 | 1.0 |
| Benzophenone | 3.0 | 3.0 | 3.0 | 3.0 | 3.0 | 3.0 | 3.0 | 3.0 |
| Benzoin isobutyl ether | 1.0 | 1.0 | 1.0 | 1.0 | 1.0 | 1.0 | 1.0 | 1.0 |
| Pentaerythritol tetrakis (β-mercaptopropionate) | 3.0 | 0.0 | 3.0 | 0.0 | 3.0 | 0.0 | 3.0 | 0.0 |
| Viscosity, thousand cps | 30 | 4 | 30 | 4 | 30 | 4 | 30 | 4 |

The formulations are employed to coat aluminum panels to a wet film thickness of 1.5 mil. The thus-coated substrates are exposed in air to ultraviolet radiation (200 watt/in. mercury lamp) at a line speed of 100 feet per minute. The exposure time required in separate passes through the curing unit to obtain a tack-free, marresistant surface is as follows:

| Formulation | A | B | C | D | E | F | G | H | I | J | K | L | M | N | O | P |
|---|---|---|---|---|---|---|---|---|---|---|---|---|---|---|---|---|
| Number of passes at 100 fpm | 5 | 9 | 4 | 6 | 2 | 1 | 2 | 2 | 2 | 1 | 2 | 2 | 1 | 1 | 2 | 2 |

The data demonstrate that unsaturated urethane oligomer compositions derived from poly(alkylene oxide) polyols cure in air at a rate significantly greater than do such oligomer compositions derived from polyester polyols. The data further demonstrate the faster cure rate in air of oligomers prepared from poly(tetramethylene oxide) polyol in comparison to such oligomers prepared from poly(propylene oxide) polyol. The data also demonstrate that poly(tetramethylene oxide) polyol-based unsaturated urethane oligomer compositions, using a mixed photosensitizer-photoinitiator photocatalyst system without chain-transfer agent, cure in air at rates equivalent to, and in some instances, faster than, the same compositions employing the same photocatalyst system with chain-transfer agent.

What is claimed is:
1. A coating composition comprising
(A) at least one unsaturated urethane resin comprising the reaction product of
(i) at least one organic isocyanate compound having at least two isocyanate groups;
(ii) at least one poly(alkylene oxide) polyol, said polyol having from 1 to 9 carbon atoms in the alkylene group separating each pair of oxygen atoms, and
(iii) at least one unsaturated addition-polymerizable monomeric compound having a single isocyanate-reactive active hydrogen group;
there being present an excess of isocyanate compound with respect to the hydroxyl groups of said poly(alkylene oxide) polyol;
said unsaturated addition-polymerizable monomeric compound having a single isocyanate-reactive active hydrogen group being present in an amount sufficient to provide at least one molar equivalent of active hydrogen group with respect to isocyanate reactivity;
B) A reactive diluent system comprising at least one unsaturated addition-polymerizable monomeric compound which is copolymerizable with said unsaturated urethane resin;
the amount of unsaturated urethane resin being in the range from about 30 to about 90 weight percent, based on total weight of unsaturated urethane resin and reactive diluent system;
(C) At least one aromatic ketone or aromatic aldehyde photosensitizer which promotes photopolymerization through bimolecular photochemical reactions of the energy donor type or hydrogen abstraction type; and
(D) At least one aromatic ketone photoinitiator which generates a radical pair by way of unimolecular homolysis resulting from photoexcitation.
2. A coating composition according to claim 1 wherein at least one of said poly(alkylene oxide) polyols is poly)tetramethylene oxide) glycol.
3. A coating composition according to claim 1 wherein said isocyanate compound is present in an amount sufficient to provide an NCO:OH ratio of at least 2.3:1, with respect to the hydroxyl groups of said polyalkylene ether polyol.
4. A coating composition according to claim 3 wherein said photosensitizer is present in an amount in the range from about 0.01 to about 50 parts by weight, and said photoinitiator is present in an amount in the range from about 0.01 to about 10 parts by weight, said parts by weight being per 100 parts by combined weight of said unsaturated urethane resin and said reactive diluent system.
5. A coating composition according to claim 4 wherein at least one of said poly(alkylene oxide) polyols is poly(tetramethylene oxide) glycol.
6. A coating composition according to claim 5 wherein said photosensitizer is benzophenone and said photoinitiator comprises benzoin isobutyl ether.
7. A coating composition according to claim 1 containing from about 0.01 to about 5 parts by weight, per 100 parts by combined weight of said urethane resin and said reactive diluent system, of at least one thiol selected from the group consisting of monothiols and polythiols, said polythiols having a molecular weight in the range from about 95 to about 20,000 and having the general formula

wherein $R^9$ is a polyvalent organic moiety and m is at least 2.
8. A coating composition according to claim 7 wherein at least one of said poly(alkylene oxide) polyols is poly(tetramethylene oxide) glycol.
9. A coating composition according to claim 7 wherein such isocyanate compound is present in an amount sufficient to provide an NCO:OH ratio of at least 2.3:1, with respect to hydroxyl groups of such poly(alkylene oxide) polyols.
10. A coating composition according to claim 9 wherein said photosensitizer is present in an amount in the range from about 0.01 to about 50 parts by weight, and said photoinitiator is present in an amount in the range from about 0.01 to about 10 parts by weight, said parts by weight being per 100 parts by combined weight of said unsaturated urethane resin and said reactive diluent system.

11. A coating composition according to claim 10 wherein at least one of said poly(alkylene oxide) polyols is poly(tetramethylene oxide) glycol.

12. A coating composition according to claim 11 wherein said photosensitizer is benzophenone, said photoinitiator is benzoin isobutyl ether, and said thiol compound is pentaerythritol tetrakis (β-mercaptopropionate).

13. a coating composition according to claim 12 wherein said diluent system contains at least one unsaturated addition-polymerizable monofunctional monomeric compound selected from the group consisting of esters having the general formula $$CH_2=C-C-O-R;$$
$$\phantom{CH_2=}\underset{R^0}{|}\phantom{C-O-R}$$
$$\phantom{CH_2=C-}\overset{O}{\|}$$

wherein $R^o$ is hydrogen or methyl and R is an aliphatic or cycloaliphatic group having from 4 to 18 carbon atoms.

14. A coating composition according to claim 13 wherein at least one of said poly(alkylene oxide) polyols is poly(tetramethylene oxide) glycol.

15. A coating composition according to claim 14 wherein said photosensitizer is benzophenone, said photoinitiator is benzoin isobutyl ether, and said thiol compound is pentaerythritol tetrakis (β-mercaptopropionate).

16. A coating composition according to claim 1 wherein said unsaturated urethane resin comprises the reaction product of
 (A) at least one isocyanate-functional prepolymer, said prepolymer comprising the reaction product of
  (a) at least one organic isocyanate compound having at least two isocyanate groups; and
  (b) at least one poly(alkylene oxide) polyol, said polyol having from 1 to 9 carbon atoms in the alkylene group separating each pair of oxygen atoms;
 the amount of such isocyanate compound being sufficient to provide an excess of isocyanate groups with respect to hydroxyl groups of such poly(alkylene oxide) polyol; and
 (B) at least one unsaturated addition-polymerizable monomeric compound having a single isocyanate-reactive active hydrogen group;
 the amount of such unsaturated addition-polymerizable monomeric compound having a single isocyanate-reactive active hydrogen group being sufficient to provide at least one molar equivalent of active hydrogen group with respect to the isocyanate groups of such prepolymer.

17. A coating composition according to claim 16 wherein at least one of said poly(alkylene oxide) polyols is poly(tetramethylene oxide) glycol.

18. A coating composition according to claim 16 wherein said isocyanate compound is present in an amount sufficient to provide an NCO:OH ratio of at least 2.3:1, with respect to the hydroxyl groups of said poly(alkylene oxide) polyol.

19. A coating composition according to claim 18 wherein said photosensitizer is present in an amount in the range from about 0.01 to about 50 parts by weight, and said photoinitiator is present in an amount in the range from about 0.01 to about 10 parts by weight, said parts by weight being per 100 parts by combined weight of said unsaturated urethane resin and said reactive diluent system.

20. A coating composition according to claim 19 wherein at least one of said poly(alkylene oxide) polyols is poly(tetramethylene oxide) glycol.

21. A coating composition according to claim 20 wherein said photosensitizer is benzophenone and said photoinitiator is benzoin isotutyl ether.

22. A composition according to claim 16 containing from about 0.01 to about 5 parts by weight, per 100 parts by combined weight of said urethane resin and said reactive diluent system of at least one thiol selected from the group consisting of monothiols and polythiols, said polythiols having a molecular weight in the range from about 95 to about 20,000 and having the general formula $$R^9(SH)_m,$$

wherein $R^9$ is a polyvalent organic moiety and m is at least 2.

23. A coating composition according to claim 22 wherein at least one of said poly(alkylene oxide) polyols is poly(tetramethylene oxide) glycol.

24. A coating composition according to claim 22 wherein such isocyanate compound is present in an amount sufficient to provide an NCO:OH ratio of at least 2.3:1, with respect to the hydroxyl groups of such poly(alkylene oxide) polyols.

25. A coating composition according to claim 24 wherein said photosensitizer is present in an amount in the range from about 0.01 to about 50 parts by weight and said photoinitiator is present in an amount in the range from about 0.01 to about 10 parts by weight, said parts by weight being per 100 parts by combined weight of said unsaturated urethane resin and said reactive diluent system.

26. A coating composition according to claim 25 wherein at least one of said poly(alkylene oxide) polyols is poly(tetramethylene oxide) glycol.

27. A coating composition according to claim 26 wherein said photosensitizer is benzophenone, said photoinitiator is benzoin isobutyl ether, and said thiol is pentaerythritol tetrakis (β-mercaptopropionate).

28. A coating composition according to claim 24 wherein said diluent system contains at least one unsaturated addition-polymerizable monofunctional monomeric compound selected from the group consisting of esters having the general formula $$CH_2=C-C-O-R;$$
$$\phantom{CH_2=}\underset{R^0}{|}\phantom{C-O-R}$$
$$\phantom{CH_2=C-}\overset{O}{\|}$$

wherein $R^o$ is hydrogen or methyl and R is an aliphatic or cycloaliphatic group having from 4 to 18 carbon atoms.

29. A coating composition according to claim 28 wherein at least one of said poly(alkylene oxide) polyols is poly(tetramethylene oxide) glycol.

30. A coating composition according to claim 29 wherein said photosensitizer is benzophenone, said photoinitiator is benzoin butyl ether, and said thiol is pentaerythritol tetrakis (β-mercaptopropionate).

31. A coating composition according to claim 30 wherein said poly(tetramethylene oxide) glycol has a molecular weight in the range from about 250 to about 4000.

32. A method for coating a substrate comprising applying to said substrate a coating composition according to claim 1, and exposing such coated substrate to actinic radiation in the presence of oxygen for a period of time sufficient to cure said coating to a hard mar-resistant surface.

33. The product of claim 32.